Nov. 18, 1969    J. DICHTER    3,479,174
APPARATUS FOR THE AUTOMATIC PRODUCTION OF GLASS BOTTLES
Filed May 21, 1965    3 Sheets-Sheet 1
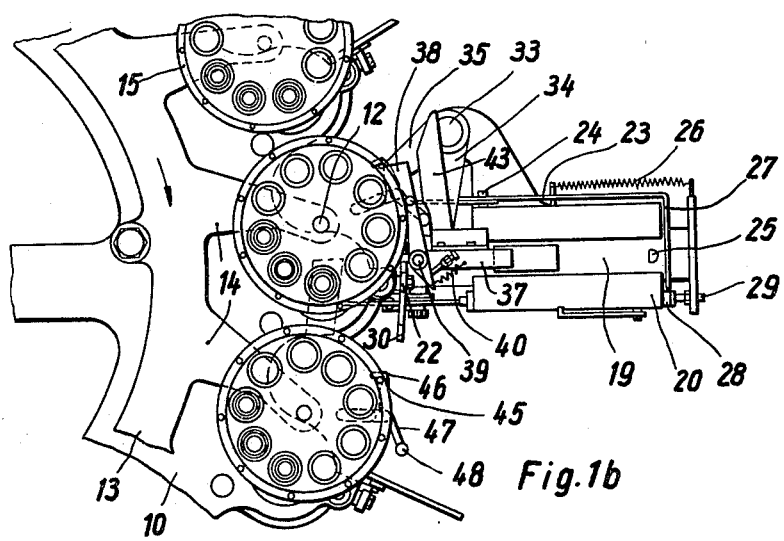
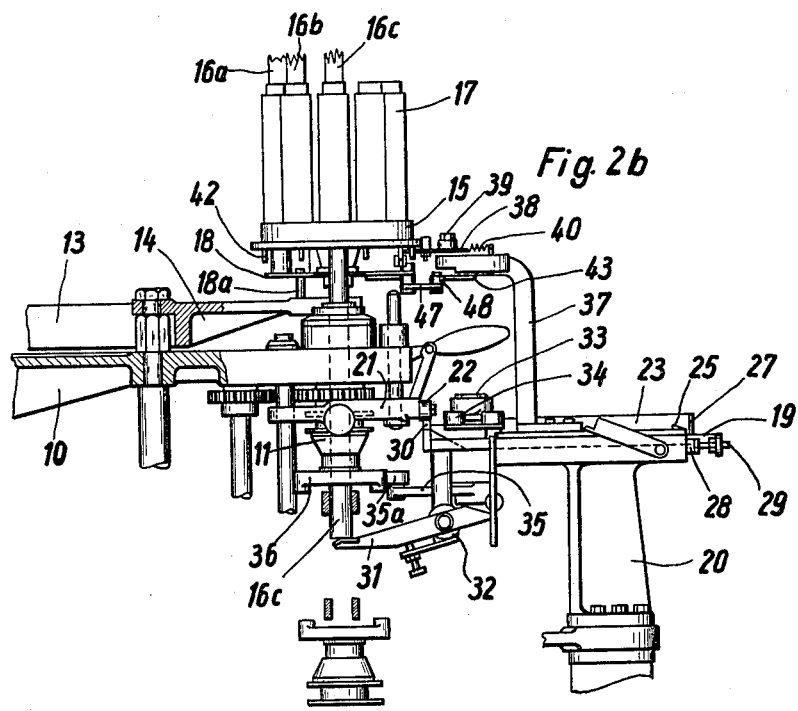
Inventor:
JAKOB DICHTER Nov. 18, 1969    J. DICHTER    3,479,174
APPARATUS FOR THE AUTOMATIC PRODUCTION OF GLASS BOTTLES
Filed May 21, 1965    3 Sheets-Sheet 2

Inventor:
JAKOB DICHTER

United States Patent Office 3,479,174
Patented Nov. 18, 1969

3,479,174
APPARATUS FOR THE AUTOMATIC PRODUCTION
OF GLASS BOTTLES
Jakob Dichter, 93 Sachsendamm, 1 Berlin 62,
Schoneberg, Germany
Filed May 21, 1965, Ser. No. 457,687
Claims priority, application Germany, May 26, 1964,
D 44,527
Int. Cl. C03b 9/40, 11/16
U.S. Cl. 65—323                    5 Claims

ABSTRACT OF THE DISCLOSURE

A glass working machine of the type including several chucks fed with glass tubes stored in rotatable magazines each mounted over a chuck is disclosed. Means are disclosed for guaranteeing that the magazine also comes to rest in a clearly defined chuck feeding position when feeding an empty chuck. This means includes a locking device for each machine which, at the end of a switching phase, locks the magazine in a precisely indexed position and prevents rotation of the magazine. This locking device guarantees that the axis of the axis of the chuck and the axis of the vertically oriented glass tube in the associated magazine are correctly aligned during feeding of the tube from the magazine to the chuck.

BACKGROUND OF THE INVENTION

This invention relates to glass working machines and, in particular, to a feed index mechanism for feeding glass tubes to chucks so that they may be further processed such as by being made into bottles, said machine being of the kind including several chucks arranged in a circle around, and all rotating about, a common central axis, said chucks holding the glass tubes in a vertical attitude and conveying them past working stations which are fixed with respect to the apparatus. There being a magazine mounted over each chuck and carrying several glass tubes arranged in a circle, said magazine being arranged to be rotatable about journal means at the axis of said circle and a switching device which responds to an empty chuck by rotating the magazine about said journal means through an angle corresponding to the distance between two glass tubes carried by the magazine, whereby a glass tube may be fed from the magazine into the chuck.

A machine of this kind which has already been proposed has the disadvantage that when the machine is rotated by the switching device it does not come to rest in a clearly defined position. On the contrary, the new position of the machine often deviates somewhat from the intended position, with the result that at the end of the rotation the glass tube is not precisely positioned over the chuck, and therefore does not fall into the chuck in a perfect manner.

A machine of this type is shown in German Patent No. 1,025,110, in which a magazine 24 comes to rest when a finger 21 has passed a ratchet wheel 23. The final position of the magazines, apart from their respective kinetic energies, depends on the amount of friction in the bearings of the magazines and that between the edges of the glass tubes and the coordinated supporting disks. Naturally, there are variations in the amount of kinetic energy to be dissipated and in the delaying forces. These variations make it impossible, in known machines, always to switch the magazine by exactly the same amount. Further deviations in the actual position of a glass tube from its intended position result from the varying friction retarding the magazines.

Thus, in the machine shown in German Patent No. 1,025,110, it is necessary to choose the diameter of an opening 30 in a supporting disk 27, as shown in FIG. 2 of German Patent No. 1,025,110, greater than the inner diameter of the sleeve 29 and greater than the still smaller outer diameter of the glass tube 28. In most cases, the glass tube which is to be dropped into the empty chuck is not precisely aligned with the chuck at the end of the switching phase, which results in the danger that the glass tube, while falling into the chuck, strikes against parts of the latter and is damaged.

This disadvantage is eliminated by the invention, in that each magazine has a locking device which normally prevents the magazine from rotating but releases it when said magazine is rotated by the switching device.

The effect of this locking device is that the positions of rest of the magazine are unambiguously determined, with the result that the glass tube which has to fall into the now empty chuck is precisely in line with the chuck at the end of the switching phase.

In apparatus according to the invention, a slider carrying the switching mechanism is displaced radially in the direction of the central axis in order to rotate a magazine one step, said slider having a cam which rotates the lock in the form of a lever when the slider is in the switching position.

For example the lock can be constructed as a two-armed lever, one end of which has a roller which works in conjunction with the cam, while its other end has a claw which normally embraces one of the pins of the magazine and which work in conjunction with a switching catch when the magazine is rotated, whereby the claw releases this pin when the roller rotates the lever under the influence of the cam.

Further details of the invention are illustrated in the drawing wherein:

FIG. 1b is a plan view similar to FIG. 1a showing part of the glass working machine according to the invention in a position, in which a new glass tube has just been fed into the chuck;

FIG. 2b is a side view of the machine of FIG. 1, partly sectioned;

DETAILED DESCRIPTION OF THE INVENTION

Figure 1A:
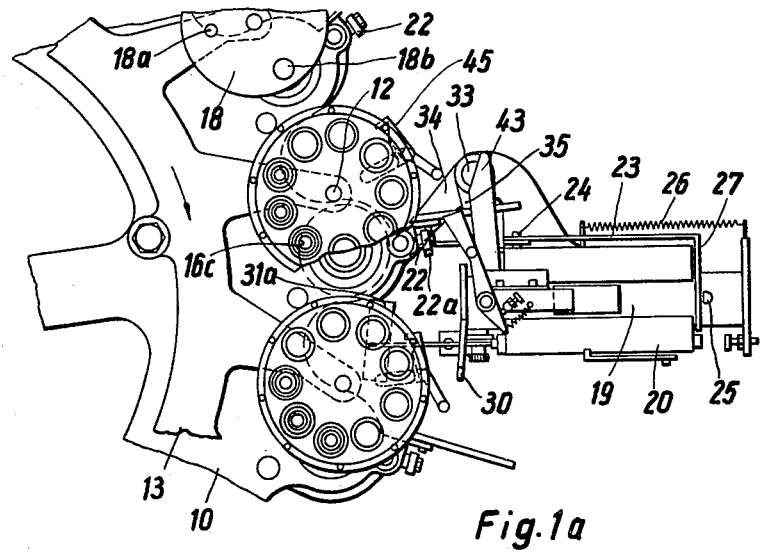
FIG. 1a is a plan view showing part of the glass working machine according to the invention in a position, in which feeding of a glass tube into an empty chuck is beginning.

The glass working machine according to the invention for automatically manufacturing bottles includes a spider 10, rotating continuously and supporting a number of open-ended chucks 11, which hold glass tubes in a vertical attitude. The chucks 11 shown in the application drawings are completely conventional and are of the same construction as the various chucks shown in my prior Patents 2,050,088, 2,199,322 and 2,282,993. For further details concerning the chucks 11 reference is made to my prior Patent 1,981,692. By means of the chucks, glass tubes are conveyed past individual working stations (not shown in the drawing) which among other things warm up selected parts of the glass and shape them in predetermined ways and melt off the shaped bottles.

Attached to the spider 10 is a ring 13 which has outwardly extending arms 14 supporting magazines 15. Each magazine is mounted rotatably on a vertical shaft 12 and has tube holders 17 arranged concentrically in a circle about the shaft. Glass tubes 16a, 16b and 16c are held in the tube holders 17, see FIGS. 1a and 1b. Each tube 16a, 16b and 16c rests with its lower end on a slippery plate 18 which is centered about one of the shafts 12 which are attached to each of the arms 14 of ring 13. The plate 18 is held against rotation by means of a peg 18a. As shown in the upper part of FIG. 1a, the slippery plate 18 has a hole 18b, in line with the central axis of the chuck 11.

When a chuck 11 is empty and the magazine is rotated one step, the glass tube 16c is pushed along until it is aligned over the hole 18b in the slippery plate 18 and then it falls through the hole into the chuck.

Figure 2A:
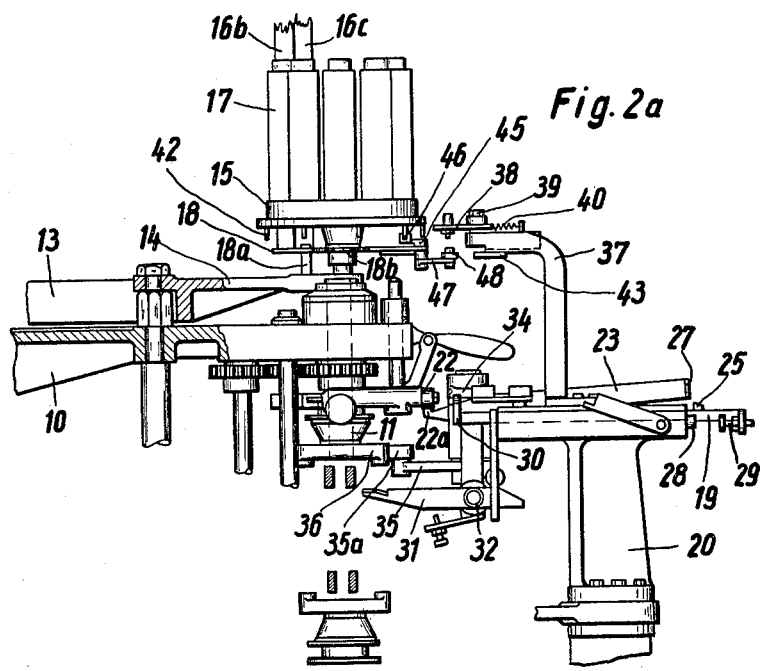
FIG. 2a is a side view of the machine of FIG. 1, partly sectioned.
Figure 3:
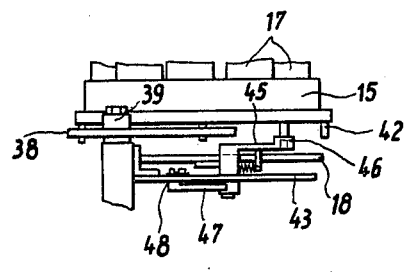
FIG. 3 is a side view of part of the machine of FIG. 2b, as seen from the right.

Rotation of the magazines 15 is controlled by a switching device which responds to any empty chuck 11 by rotating the magazine 15 a step corresponding to the angular distance between two adjacent glass tubes in the magazine. This switching device consists of a slider 19 which is mounted for reciprocating movement within a part of a frame 20. Each chuck 11 has an operating yoke 21 equipped with a control roller 22. When a glass tube is in the chuck 11, the control roller 22 moves past the switching device without influencing it because the yoke 21 and roller 22 are in an upper position, as shown in FIG. 2b. On the other hand, if the chuck 11 is empty, the control roller 22 is in the somewhat lower position shown in FIG. 2a and actuates the switching device by depressing a feeler 22a, which is attached to one end of a double-armed locking lever 23. The locking lever is pivoted on the frame 20 at 24. Thus, if the feeler 22a moves downwards the other end 27 bent at a right angle to the one end of the locking lever 23 is lifted into a position shown in FIG. 2a. In this position a boss 25 mounted on the slider 19 is released and under the influence of a spring 26 the slider moves from its right position shown in FIGS. 1a and 2a into its left position shown in FIGS. 1b and 2b. The slider's position to the left is determined by a screw 29 which is mounted on the slider 19 and comes into contact with a stop 28 on the frame 20. A machine with magazines and a switching device described above has already been disclosed in my prior Patent No. 3,069,047, from which further details may be had.

If the slider 19 has reached its left position, see FIG. 2b, a rail 30 is moved into the path of the control roller 22 and with further rotation of the spider 10 this rail 30 lifts the roller 22 thus also lifting the yoke 21 of the chuck and opening the latter. At the same time, the magazine 15 is rotated one step further by a switch mechanism with the result that the glass tube 16c falls through the hole 18b in the plate 18 into the chuck which is held open by the rail 30, and passes partly through the chuck onto a platform 31a fixed to a catch arm 31. The catch arm 31 is attached to the slider 19 by a fractional pivot assembly 32 and catches the falling glass tube. With further rotation of the spider 10 the control roller 22 reaches a steeply downwardly sloping part of the rail 30, whereby the roller and the yoke 21 move downwardly, thus the chuck 11 closes and holds the glass tube 16c which has dropped into it.

The return movement of the slider takes place as follows: On the frame 20 there is pivoted at 33 a bell crank, one arm 34 of which is connected to the slider 19 by means of a connecting link, while the other arm 35 projects into the path of a stop 36, which forms a part of the flange on the chuck 11. When the stop 36 of the chuck 11, following the chuck which has just been refilled, contacts the roller 35a at the end of arms 35, the bell crank is rotated counter-clockwise about the pivot 33 and thus pushes the slider 19 back into its position of rest to the right, whereby the boss 25 passes underneath the end 27 of the locking lever 23. As soon as the bell crank is released by the stop 36, the spring 26 again comes into action and pushes the slider 19 towards the left, with the result that the boss 25 presses against the end 27 of the locking lever 23. Thus, the slider 19 is held in its right-hand end position. During this movement towards the right, the rail 30 is displaced from the path of the roller 22, the catch plate 31a of the catch lever 31 moves out of the path of the glass tube 16c within the chuck 11 and the switching device moves out of the path of the magazine, whereby the catch arm is rotated somewhat clockwise by a guiding element which again brings it into a position for catching a further glass tube.

Figure 4:
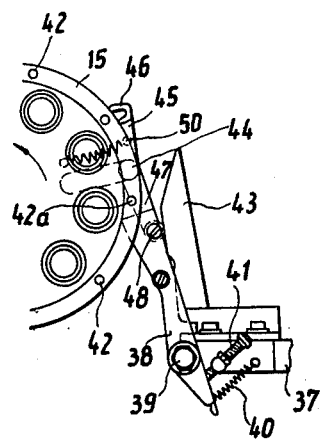
FIG. 4 is a plan view of a magazine at a certain instant during the switching process.
Figure 5:
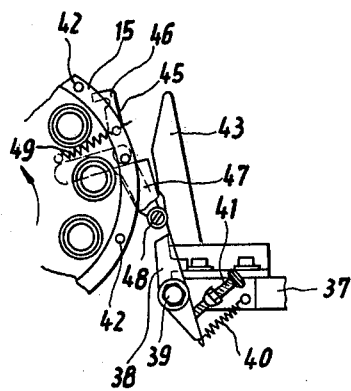
FIG. 5 is a plan view of a magazine at a second instant during the switching process.

Mounted on the switching device for rotating the magazine is a switching catch 38 pivoted on a pin 39 of an upwardly extending arm 37 of the slider 19. A spring 40 tends to rotate this catch 38 counter-clockwise until stopped by a set screw 41 shown in FIGS. 4 and 5. This set screw 41 is used for adjusting the position of the catch 38.

Extending downwardly from the magazine 15 are a number of angularly spaced pins 42 corresponding to the tube holders 17. When the slider 19 is in the right-hand position, the catch 38 is also in its right-hand position, with the result that the pins 42 of the magazine 15 move past the catch 38 without touching it (FIG. 2a). On the other hand, when the slider is in its left-ward position, that is to say, its end position towards the left, with the continuous rotation of the spider 10 the outermost pin 42a (see FIG. 4) runs up against the catch 38 which prevents the magazine from rotating with the spider and causes the magazine 15 to rotate about its shaft 12 until the pin 42a is again released by the catch 38. The magazine rotates by an amount corresponding to the angular distance between the two tube holders 17, with the result that the next glass tube 16c in the magazine drops through hole 18b in the plate 18 into the chuck 11.

Also mounted on the arm 37 of the slider 19 is a cam 43 which works in conjunction with a locking mechanism consisting of a two-armed lever pivoted on the plate 18 at 44. One arm 45 of this lever is provided with a claw 46 at its end (FIGS. 4, 5) and the claw is arranged to engage the pins 42. The other arm 47 of the lever has a roller 48 at its end. A spring 49 is anchored at one end to the pin 50 on the arm 45 of the two-armed lever and at its other end to the slippery plate 18. The spring 49 rotates the two-armed lever 45, 47 counter-clockwise so that the claw 46 embraces one of the pins 42. In this way, the magazine is prevented from rotating about its spindle 42. Thus, when the slider 19 is in its extreme right position, the roller 48 moves past the cam 43 without touching it. On the other hand, when the slider 19 is in its extreme left position, rotation of the apparatus causes the roller 48 to move into contact with the cam 43, causing the two-armed lever 45, 47 to rotate clockwise against the influence of the spring 49. The claw 46 therefore is disengaged from the pin 42 (see FIG. 4) and consequently the magazine 15 can rotate. Subsequently, when a pin 42 contacts the catch 38, it causes the magazine 15 to rotate, as mentioned above. At the same time the roller 48 rolls along the cam 43. A step in the cam 43 now causes the two-armed lever 45, 47 to rotate counterclockwise with respect to the plate 18. In this way, the claw 46 again enters the path of movement of the pins 42, and stops movement of the magazine 15 as soon as the next pin 42 becomes engaged within the claw 46. Thus, the magazine can each time rotate only by a definite and limited amount, which ensures that a tube holder 17 is always aligned directly above the chuck 11.

I claim:

1. In a glass working machine of the type including a rotatable support member arranged to revolve continuously about its vertical axis, a plurality of open-ended chucks being supported by said support member and arranged in a circle about the vertical axis thereof, said chucks holding glass tubes in a vertical orientation while conveying the tubes past stationary working stations, a number of magazines mounted on and rotatable with said support member with each said magazine containing a plurality of glass tubes arranged in a circle concentric with the vertical axis of said magazine, said magazine being rotatable about its vertical axis for aligning individual ones of the glass tubes above a corresponding said chuck, the invention comprising switching means mounted at a chuck loading station at the periphery of said support member adjacent the path of travel of said chucks and magazines, said switching means comprising reciprocating means cooperating with said chuck at the chuck loading station for movement inwardly toward said support member when said chuck is empty and for movement outwardly from said support member when said chuck contains a glass tube, locking means mounted on said support member and cooperating with said magazine for holding said magazine against rotation as it rotates with said support member and for positively positioning said magazines relative to said chuck for aligning the glass tubes directly above said chuck, a release member mounted on said switching means for releasing said locking means from said magazine when said reciprocating means are in the inward position, and catch means mounted on said switching means and being displaceable with said reciprocating means into the path of said magazine at the chuck loading station for rotating said magazine about its axis when said reciprocating means are in the inward position to rotate said magazine through a predetermined angular distance for loading a glass tube into the corresponding said chuck.

2. In a glass working machine, as set forth in claim 1, wherein each said magazine has plural pins corresponding in number to the number of glass tubes carried thereby and uniformly angularly spaced around a circle concentric with the axis of magazine rotation; said locking means comprising a pivotally mounted two-armed lever, a roller on one end of said lever and a claw on the opposite end of said lever; said claw normally embracing one of said pins; said release member comprising a cam cooperable with said roller and carried by said switching means; said switching means pivoting said lever for step-by-step rotation of the associated magazine by said switching means, with said claw releasing a magazine pin when said lever is pivoted by said roller as said roller moves over said cam.

3. In a glass working machine, as set forth in claim 2, wherein a circular plate being fixedly positioned beneath each said magazine; said plate having an aperture therein aligned with the associated said chuck and serving to support the glass tubes in the associated said magazine during rotation of the associated magazine; and a pivot pin on each said plate forming a pivot for the associated said two-armed lever.

4. In a glass working machine, as set forth in claim 2, wherein a spring is connected at one end to said two-armed lever for biasing said lever into a position in which said claw thereof embraces one of said pins on the associated said magazine.

5. In a glass working machine, as set forth in claim 4, wherein one end of said spring is anchored on a pin on said two-armed lever, the other end of said pin being anchored to said apertured plate.

References Cited
UNITED STATES PATENTS

| | | | |
|---|---|---|---|
| 1,338,941 | 5/1920 | Lindahl | 65—109 X |
| 1,390,626 | 9/1921 | Lindahl | 65—109 X |
| 2,771,710 | 11/1956 | Molinari et al. | 65—110 |
| 3,069,047 | 12/1962 | Dichter | 221—82 X |
| 3,283,951 | 11/1966 | Gladfelder | 221—11 |

S. LEON BASHORE, Primary Examiner

ARTHUR D. KELLOGG, Assistant Examiner

U.S. Cl. X.R.

65—109, 265, 276; 221—11, 83, 105